April 12, 1955 L. K. EDWARDS 2,705,940
CONTROLLABLE POWER ACTUATOR FOR AIRCRAFT CONTROL SURFACE
Filed Nov. 6, 1950 2 Sheets-Sheet 1
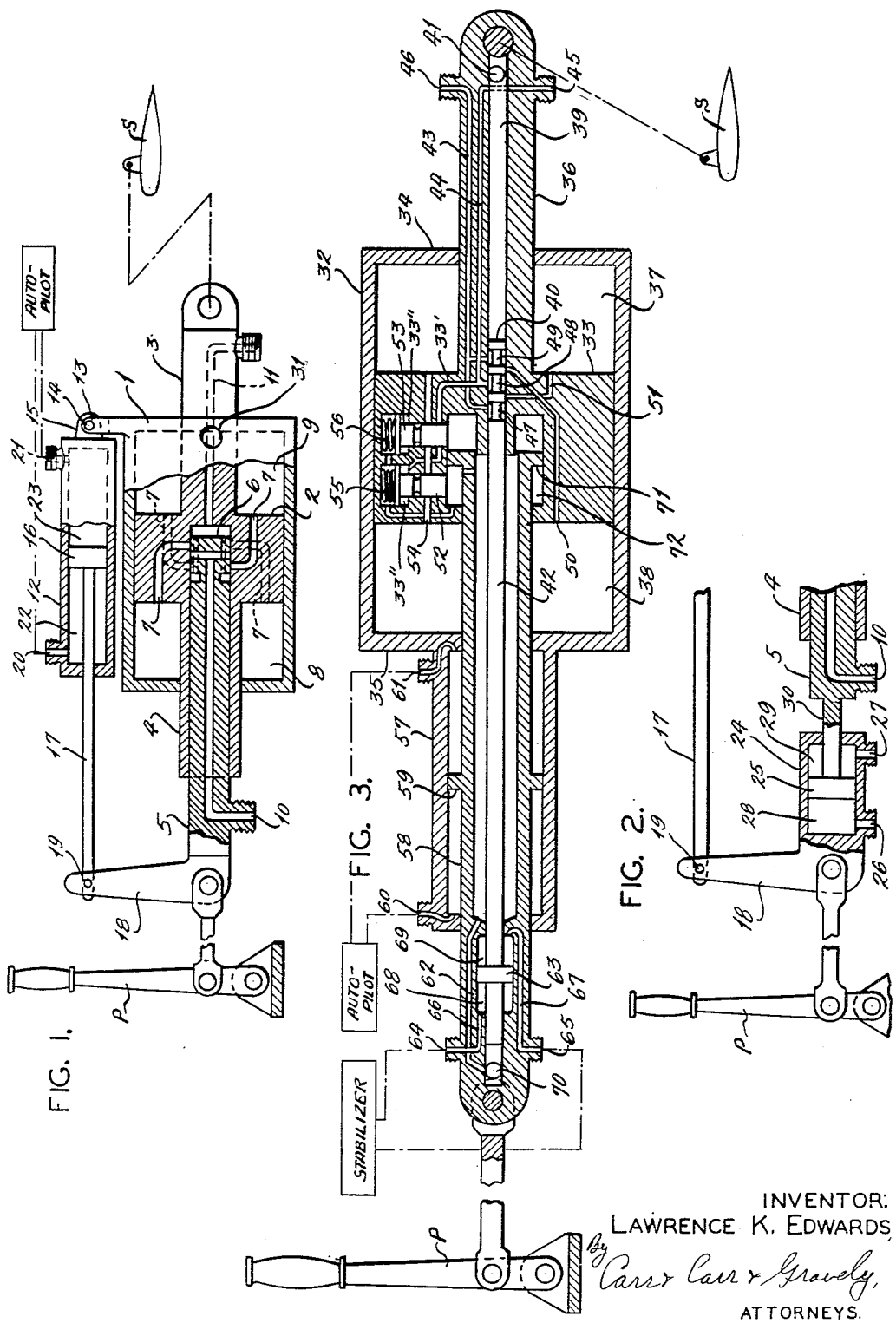
INVENTOR:
LAWRENCE K. EDWARDS
By Carr & Carr & Gravely,
ATTORNEYS.

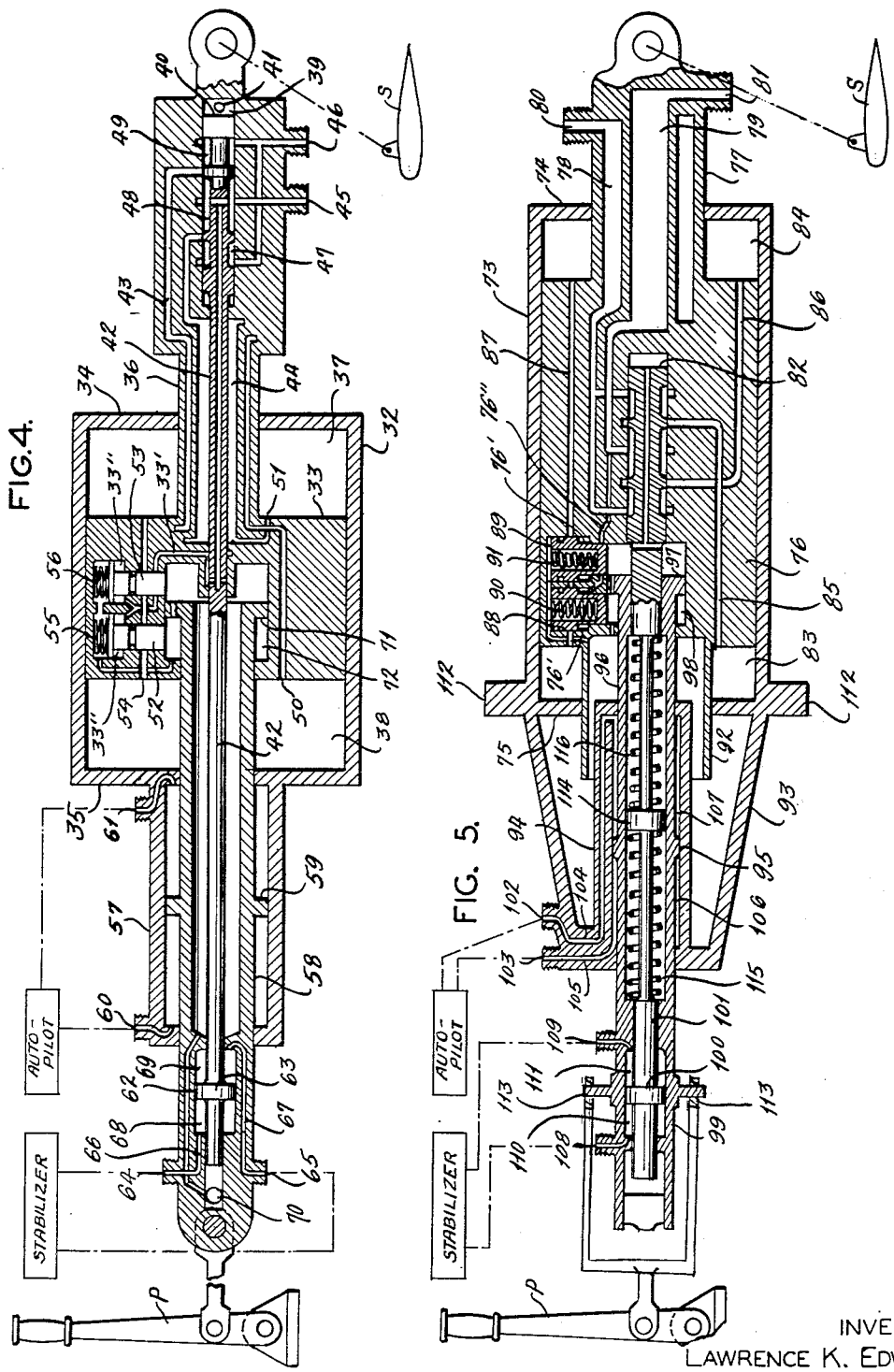

United States Patent Office 2,705,940
Patented Apr. 12, 1955

2,705,940

CONTROLLABLE POWER ACTUATOR FOR AIRCRAFT CONTROL SURFACE

Lawrence K. Edwards, Glendale, Mo., assignor to McDonnell Aircraft Corporation, St. Louis, Mo., a corporation of Maryland Application November 6, 1950, Serial No. 194,337

9 Claims. (Cl. 121—41)

This invention relates to control mechanism for aircraft and is more particularly directed to an irreversible hydraulic mechanism responsive to both automatic control devices and to manually-operated devices for adjusting the control surfaces of an aircraft.

The primary object of the invention is to combine in a single device an irreversible hydraulically-actuated mechanism responsive to a mechanical input and means responsive to input other than the mechanical for adjusting the control surfaces of an aircraft.

Another object of the invention is to provide a hydraulically-operated mechanism for aircraft control surfaces including emergency means for continuing the operation of the control device in the event of pressure supply failure to the hydraulically-operated mechanism.

The invention consists in the provision of a reciprocating hydraulic motor having a piston therein provided with an internal reversing valve for controlling the relative motion of the piston and the cylinder, the reversing valve being controlled by an auxiliary fluid motor mounted on the piston rod, one portion of which is a part of the manually-actuated valve member.

The invention also consists in the provision of an auxiliary fluid motor pivotally mounted on the primary fluid motor and in which the piston of the auxiliary motor is connected to the manually-actuated rod for shifting the reversing valve in the piston of the primary fluid motor.

The invention further consists in the provision of a second auxiliary fluid motor for modifying or biasing the action of the fluid motor controlled by the autopilot as well as the action of the manual control for eliminating undesirable motions in the aircraft on which an actuated control surface is mounted.

In the drawings:

Fig. 1 is a longitudinal sectional view of one embodiment of the invention,

Fig. 2 is a longitudinal sectional view of an auxiliary fluid motor for the device shown in Fig. 1, Fig. 3 is a longitudinal sectional view of a modified form of the invention, Fig. 4 is a longitudinal sectional view of a device similar to that shown in Fig. 3 but with the valve for the control surface motor being located externally of the motor; and Fig. 5 is a longitudinal sectional view of another modified form of the invention.

In the device illustrated in Fig. 1, a cylinder 1 has a piston 2 slidably mounted therein, said cylinder and piston constituting the primary fluid motor. The piston is provided with a rod 3 extending through one end of the cylinder and having a tubular piston rod 4 extending through the other end of the cylinder. A valve stem 5 is slidably mounted in the tubular piston rod and a reversing valve 6 is slidably received in a suitable bore in the piston. The piston is also provided with a plurality of ducts 7 cooperating with the valve for selectively supplying pressure fluid to chambers 8 and 9. The valve stem 5 has an inlet duct 10 therein connected to a suitable source of pressure fluid supply, and the piston rod 3 has an exhaust duct 11 therein. These ducts form part of a closed hydraulic circuit for the primary motor. The piston is connected to the control surfaces of an aircraft. The valve stem is connected to a manual control member P and to an automatic control device, such as an autopilot, for controlling the motion of the valve stem 5. The manually-operated device P in the cockpit of the plane is schematically illustrated.

The valve stem 5 may be moved relative to piston 2 by an auxiliary cylinder 12 pivotally mounted on a bracket 13 secured to cylinder 1, a pin 14 being inserted in the bracket for this purpose. An extension or boss 15, integral with cylinder 12, cooperates with the bracket 13 for pivotal motion although the auxiliary cylinder may, if so desired, be rigidly secured thereto. The cylinder 12 is provided with a piston 16 slidably mounted therein whose piston rod 17 is connected to a bracket 18 integral with the valve stem 5, there being a pin 19 for providing the connection between piston rod 16 and the bracket 17. The valve stem 5 is directly connected to the pilot-actuated means P for adjusting the control surface to which piston rod 3 is connected. The cylinder 12 is also provided with inlet ports 20 and 21 connected to the autopilot and specifically to a reversing valve (not shown) provided in the autopilot for selectively applying pressure fluid to chambers 22 and 23. The reversing valve for the auxiliary cylinder is controlled by an autopilot or other remotely located automatic control device. The action of the auxiliary cylinder 12 and the resultant motion of valve stem 5 causes the control mechanism P at the pilot's station to move, thus giving the pilot an indication of the control surface movements as governed by the autopilot, or other automatic control device. The pressure employed, and the cross sectional area of the auxiliary cylinder, is such that the pilot may over-ride the autopilot at any time by simply applying the necessary force to the control mechanism P. In the event the manual force applied to valve stem 5 by the pilot exceeds the force applied by the auxiliary cylinder, the manual or pilot's force will govern. A manual control device for valve stem 5 is schematically illustrated at P.

The operation of valve 6 by the pilot moving the control device in a direction to the left in Fig. 1 places the cross passage at the inner end of the pressure fluid inlet duct 10 in communication with lower duct 7 (shown in full line) so that chamber 9 receives the fluid. Concurrently, the inner end of the valve 6 uncovers the end of the upper duct 7 (shown in full line) so that the fluid in chamber 8 may flow into the exhaust duct 11 in the rod 3. The unbalanced pressures at opposite sides of the power piston 2 causes its movement to the left, and the piston 2 will continue to move until it again closes the cross passage for duct 10. Movement of the control device in the opposite direction from that above described will result in piston 2 moving to the right. This motion is obtained by opening the respective lower and upper ducts 7 (shown in dotted line) to the inlet 10 and exhaust 11. If the autopilot is placed in operation, the movement of piston 16, due to demands of the autopilot, will have the same control effect on piston 6 as just described for its movement caused by the manual device.

An additional feature for controlling the reversing valve 6 of Fig. 1 is illustrated in Fig. 2. In this construction a second auxiliary cylinder 24 is interposed between bracket 18 and the valve stem 5. The bracket 18 is controlled by the pilot's control mechanism P or by the auxiliary cylinder 12 acting through piston rod 17 as previously described. The function of the second auxiliary cylinder 24 is to modify or bias the power input from these two sources in response to signals from a third source, for example, an independent artificial stabilizer or stabilization system. A piston 25 is slidably mounted in cylinder 24 and is operated by pressure fluid introduced selectively through ports 26 and 27 into cylinder chambers 28 and 29. An external reversing valve (not shown) controls the fluid flow in response to biasing signals. The piston is connected to valve stem 5 by a piston rod 30 for moving the valve stem when pressure fluid is selectively admitted into chambers 28 and 29.

With this construction, the pilot's control mechanism P and the auxiliary cylinder 12 cooperate, as above described, so that the pilot may observe and, if he desires, overpower the motions called for by the auxiliary cylinder 12, which motions are ordinarily slow and may cover a wide range of travel. The second auxiliary cylinder, being in tandem with the other two sources, may be used to modify or bias the motions called for by the pilot or by the auxiliary cylinder 12. One contemplated source for such biasing signals is a different automatic control such as an artificial stabilization system whose motions are characteristically of small amplitude but relatively fast. Thus, when the pilot is controlling the airplane, the artificial stabilization motions are superimposed on his motions without in any way interfering with the pilot. Similarly, when the autopilot is controlling the airplane, the artificial stabilization motions are superimposed on the autopilot-controlled motions, but there is no interference with the autopilot circuit and the pilot's mechanism continues to cooperate with the autopilot alone.

Whenever the piston 25 is not being operated by the aforementioned third source, it is prevented from moving relative to the cylinder 24 by external stoppage of pressure fluid flow or by other suitable means.

The above described actuating mechanisms are assembled in a single operating device that provides the features of (a) irreversible hydraulic power control in response to a mechanical input, (b) direct mechanical linking of the mechanical input to the output in the event of failure of hydraulic pressure, and (c) means for producing mechanical input motions in response to signals from automatic pilots, artificial stabilization systems, or other automatic or remote control devices. The cylinder 1 is provided with trunnions 31 for pivotal mounting in the frame of the aircraft, only one of the trunnions being shown.

Pneumatic pressure may be used in lieu of hydraulic pressure in any or all of the aforementioned cylinders. An electric or other linear actuator may also be used in lieu of any of the aforementioned auxiliary cylinders.

A modified form of the invention is illustrated in Fig. 3 in which the numeral 32 indicates the cylinder in which a piston 33 is slidably mounted, constituting the primary motor, the cylinder being provided with suitable closures 34 and 35. A piston rod 36 is connected to piston 33 and extends through closure 34 and connectable to a control surface of the aircraft. The piston 33 divides the cylinder into chambers 37 and 38. The piston rod is provided with a bore 39 in which a reversing valve 40 is slidably mounted, the bore being vented to atmosphere through a port 41 so that air may freely flow into the bore as the reversing valve 40 moves in said bore. The reversing valve is provided with a stem 42 extending through closure 35 and operable by control devices to be subsequently described. The piston rod has ducts 43 and 44 therein which terminate at inlet port 45 and exhaust port 46. These ports are connectable with circumferential passages 47, 48 and 49 in the valve 40 so that pressure fluid admitted to port 45 will be selectively introduced into chambers 37 and 38 through piston ducts 50 and 51 for moving the piston 33 in cylinder 32. Spent pressure fluid is exhausted through port 46. The ducts to which ports 45 and 46 are connected constitute part of a closed hydraulic circuit for the primary motor.

A pair of spring-pressed stops 52 and 53 are slidably mounted in suitable bores in the piston, constituting valves for duct 54 in the piston connecting chambers 37 and 38. Pressure fluid conducted from duct 44 through duct 33' to annular chambers 33" holds these stops against the force of springs 55 and 56, thus preventing transfer of fluid from one chamber to the other. Upon failure of the pressure fluid, springs 55 and 56 move the stops radially inwardly so that communication is established between chambers 37 and 38. These stops have an additional function which will be subsequentially described.

An auxiliary cylinder 57 is mounted on closure 35 and coaxially arranged with respect to cylinder 32. A tubular member 58, which acts as a piston rod, is provided with a piston 59 slidably mounted in cylinder 57, which cylinder is provided with ports 60 and 61 connected to a reversing valve whose adjustment is controlled by an automatic control device, such as an autopilot, the latter structure being shown schematically. The reversing valve controls the movement of piston 59 in cylinder 57.

A second auxiliary cylinder 62 is formed in one end of the tubular member 58 and has a piston 63 slidably mounted therein, which piston is integral with valve stem 42. The tubular member 58 is provided with ports 64 and 65 which connect with ducts 66 and 67, each terminating in cylinder chambers 68 and 69, respectively. The ports 64 and 65 are connected to a suitable reversing valve which is controlled by a different automatic control device, such as an artificial stabilizing mechanism, the reversing valve and stabilizing mechanism not being specifically shown. The valve stem 42 is slidable in bores formed in tubular member 58 and the spaces therein are vented to atmosphere through a port 70 which permits air to enter and leave the bore in tubular member 58. This tubular member has a piston 71 therein slidably mounted in bore 72 in piston 33. Suitable trunnions (not shown) are provided on cylinder 32 for mounting in the fuselage of an airplane.

A piston rod 36 is connected to aircraft control surfaces and the tubular member 58 is connected to the manually-operated control mechanism P (schematically illustrated) in the cockpit of the aircraft. The position of piston 33 in cylinder 32 is responsive to the action of the autopilot connected to the auxiliary cylinder 57. The autopilot will adjust the reversing valve 40 by controlling the application of pressure fluid to either side of the piston 59. This will move piston 59, and since piston 63 is locked against motion by the artificial stabilizing mechanism preventing changes of volume of chambers 68 and 69, piston 33 will move because the reversing valve 40 will be moved in piston rod 36 so that pressure fluid will be selectively admitted to chamber 37 or 38. The cylinder 62 and piston 63 will be moved relative to each other by the action of the artificial stabilizing mechanism, which mechanism will shift these two members relative to each other for controlling adjustment of the reversing valve 40 for selectively admitting pressure fluid into chamber 37 or 38. Thus the artificial stabilizer is so positioned that it can modify or bias the action of piston 59 in cylinder 57 controlled by the autopilot. This stabilizer can also modify or bias the action of the pilot who controls the position of tubular member 58. The stabilizer removes undesirable motions in the aircraft to which the control surface, actuated by the primary motor, is secured.

Assuming the pilot moves the control device so that the member 58 moves to the left (Fig. 3), the valve stem 42 will move a like amount because the piston 63 in the auxiliary cylinder 62 is locked in position by a balanced fluid pressure condition at its opposite faces. As a result, the valve 40 moves with the control device to uncover ducts 50 and 51 in power piston 33, whereby pressure fluid flows from the inlet duct 44 to chamber 37 through passage 48, and fluid from chamber 38 flows to exhaust duct 43 through passage 49. The unbalanced pressure across piston 33 causes its movement (to the left or lower pressure in chamber 38) relative to the valve 40 until the ducts 50 and 51 are closed at the position of piston 33 where the pressure is again in balance. Movement of the control device in an opposite direction reverses the movement of piston 33, except that ducts 50 and 51 reverse their former connections and communicate with passages 48 and 47 respectively. Passage 47 opens to the exhaust duct 43 and passage 48 opens to the inlet duct 44.

In the event of failure of pressure fluid supplied to chambers 37 and 38, the stops 52 and 53 will be moved radially inwardly by springs 55 and 56 for the purpose of establishing communication between chambers 37 and 38, at which time the piston 33 can be moved manually by the pilot. When piston 71 is centered in chamber 72 in piston 33, the stops 52 and 53 will be located on either side of piston 71, which will establish a direct mechanical connection from the pilot's control mechanism P to the control surface connected to piston rod 36 so that the aircraft will at all times be under control. In the event of such failure of pressure fluid, the artificial stabilizing mechanism and the autopilot will be ineffective.

Fig. 4 shows a construction similar to that of Fig. 3 except that the reversing valve for controlling the flow of pressure fluid to chambers 37 and 38 is located externally of the control surface actuator. The conduits conducting pressure fluid are concentrically disposed, and the operation of the device is identical to that shown in Fig. 3 and having the same reference numerals applied thereto.

Another modified form of the invention is illustrated in Fig. 5 in which the numeral 73 designates the cylinder of a primary motor for the control surface of an aircraft. This cylinder is provided with closures 74 and 75. A piston 76 is slidably mounted in cylinder 73 and a piston rod 77 is secured thereto which extends through closure 74. The piston rod has concentric ducts 78 and 79 therein, the former connected to exhaust port 80 and the latter to the inlet port 81. The piston 76 is provided with a reversing valve 82 slidably mounted therein for directing pressure fluid selectively into chambers 83 and 84 in the manner described in connection with the Fig. 3 disclosure. The piston has suitable ducts 85 and 86 for conducting pressure fluid from the reversing valve to the respective chambers. This piston also has a duct 87 for establishing communication between chambers 83 and 84 and is controlled by stops 88 and 89 acting as valves. The stops are provided with springs 90 and 91 for imposing radial inward movement in the piston, thereby establishing communication between said chambers. During the time that pressure fluid is available at inlet port 81, these stops function as valves for the duct 87. The chambers 76' in which the stops slide, are in communication with duct 79 through duct 76'' in piston 76. A tubular member 92 is connected to piston 76 and is slidably received in closure 75. A hollow casing 93 is secured to closure 75 and has a cylinder 94 integral therewith which is disposed within the tubular member 92. A piston 95 is slidably mounted in cylinder 94, a tubular rod 96 being secured thereto and extending from both ends of the piston. One end of the tubular rod is provided with a piston 97 slidably received in a cylinder bore 98 in piston 76, the other end of the tubular rod having a cylinder 99 therein. A piston 100 is slidably mounted in cylinder 99 and a piston rod 101 is secured thereto which is also the stem of reversing valve 82.

The movement of piston 95 in cylinder 94 is controlled by an automatic control device, such as an autopilot, which actuates a reversing valve (not shown), the reversing valve being connected to ports 102 and 103 which are connected to ducts 104 and 105 for selectively introducing fluid into cylinder chambers 106 and 107. The movement of piston 100, with respect to cylinder 99, is controlled by a reversing valve actuated by an artificial stabilizing mechanism (not shown) for controlling the admission of pressure fluid into ports 108 and 109 connected to cylinder chambers 110 and 111.

The piston rod 77 is connected to a control surface on the aircraft and a tubular rod 96 is connected to manually-operated mechanism (schematically illustrated) in the cockpit of the plane. The cylinder 73 is provided with trunnions 112 for pivotally mounting the cylinder 73 and its associated casing 93 in the aircraft fuselage. The cylinder 99 on tubular rod 96 is provided with trunnions 113 for pivotally connecting the cylinder and associated tubular rod to the manually-operated control mechanism (schematically illustrated) in the aircraft. The combination valve stem and piston rod 101 is provided with an integral collar 114 which serves as an abutment for compression springs 115 and 116. These springs are also abutted against suitable shoulders in the tubular rod 96. The movement of piston 76 in cylinder 73 is controlled by the autopilot and when this mechanism adjusts its associated reversing valve, the piston 95 is moved in cylinder 94. The movement of piston 100 in cylinder 99 is prevented by the action of the stabilizing mechanism and, therefore, the position of the reversing valve 82 in its bore being changed, selectively applies pressure fluid to chambers 83 and 84, thereby moving the piston rod 77 and correspondingly adjusting the control surface connected thereto. When the artificial stabilizing mechanism is actuated, the piston 100 will be moved relative to cylinder 99, thereby adjusting the position of the reversing valve 82 and correspondingly adjusting the position of the control surface. The pilot can also manually adjust the control surface as well as the position of the reversing valve 82 from the mechanism located in the cockpit of the plane. A direct connection between the manual control mechanism in the cockpit and the control surface, is established upon failure of the pressure fluid supply to inlet port 81. This action will cause springs 90 and 91 to move stops 88 and 89 radially inwardly in piston 76, thereby establishing communication between chambers 83 and 84 and locking the tubular rod 96 in position by reason of the fact that the piston 97 is located between the stops. When the pressure fluid supply fails to flow to the inlet port 81, the action of the stabilizing mechanism and that of the autopilot is rendered ineffective, thus subjecting the control surface adjustment to the manually operated device in the cockpit.

In the event of failure of pressure fluid supply to ports 108 and 109, the piston 100 will be centered with respect to the cylinder 99 by springs 115 and 116, thus enabling the cylinder 96 and its piston 95, as well as the manual control, to adjust the position of the reversing valve 82. In this device, and in that described above, the cylinder 99 and piston 100 are capable of modifying or biasing the action of the manually-operated device and that of the cylinder 94 and piston 95 controlled by the autopilot. The springs 115 and 116 are employable in the disclosures of Figs. 1 through 4 in the same manner as in Fig. 5.

The valve 82 is similar to valve 40 in that it has three circumferential control passages which serve selectively to connect the passages 85 and 86 in the power piston 76 with the fluid inlet duct 79 and exhaust duct 78. For example, when duct 85 receives fluid under pressure by way of the center passage in valve 82 from duct 79, the duct 86 is opened to the exhaust duct 78 by way of the left hand end passage in valve 82. Thus pressure in cylinder chamber 83 exceeds that in chamber 84 and piston 76 moves in response until the ducts 85 and 86 are again closed by the valve 82.

In each of the above disclosures of Figs. 3, 4 and 5, the cylinder controlled by the autopilot is integral and coaxial with and rigidly secured to the cylinder for actuating the control surface. The structures of Figs. 3 and 4 differ from that of Fig. 5 in the method of supporting the cylinder controlled by the autopilot. In Figs. 3 and 4 the pilot-actuated tubular member 58 forms the inner wall of chamber 38 of the primary cylinder. This arrangement may produce excessive manual-control friction by reason of the various packings employed for preventing leakage of pressure fluid in the primary motor. Manual control friction is reduced in the Fig. 5 disclosure because the tubular member 92 is attached to the hydraulically actuated piston 76 rather than to the pilot-actuated member 96.

In the Fig. 5 arrangement it may be desirable to have the piston 100 sufficiently under-size, with respect to the diameter of the cylinder 99, that fluid may creep past it, thereby permitting springs 115 and 116 to center the piston gradually even though the external hydraulic lines thereto are blocked. The principle of emergency centering of the artificial stabilizing cylinder 99 is equally applicable to the disclosures of Figs. 3 and 4.

The system is described in accordance with control surfaces for aircraft, such as a rudder or elevator, but it can be employed for controlling the position of a variety of devices such as radar antenna, ship rudders, search lights, and other devices requiring precise positioning, large positioning forces, and provisions for both manual and remote operation.

What I claim is:

1. A power actuator for an element to be controlled, comprising a cylinder, a piston slidably mounted in said cylinder providing a chamber in each end thereof, a rod for said piston connectable to the element, means for conducting pressure fluid through said rod into said chambers, a reversing valve in said piston for selectively directing said fluid into either of said chambers, a stem for said valve, manual means for actuating said valve stem and piston, a reciprocating fluid motor responsive to an automatic control device for actuating said stem and piston, a fluid motor for actuating said valve responsive to a different automatic control device and capable of modifying the manual means and the motor controlled by the automatic control device; and means in said piston responsive to the pressure supplied to said cylinder for permitting fluid to flow from one chamber to the other when said piston is actuated manually.

2. A power actuator for an element to be controlled, comprising a cylinder, a piston slidably mounted in said cylinder and having a rod therein connected to the element, a reversing valve in the piston and rod assembly, means for conducting pressure fluid to said valve for application to either end of said piston, a stem for said valve, a pair of stops in said piston acting as valves for permitting fluid to flow through the piston, a second cylinder mounted on said first mentioned cylinder, a piston and a rod therefor slidably mounted therein and having means thereon engageable with said stops for moving the pistons in unison upon failure of pressure fluid to said first mentioned cylinder, said second mentioned piston and rod being responsive to an automatic control device, a cylinder formed in said second mentioned piston rod, a piston on said valve stem slidably mounted in the last mentioned cylinder and responsive to an artificial stabilizing mechanism; and manual means for adjusting said valve stem and rod subject to the action of the artificial stabilizer.

3. A power actuator for an element to be controlled, comprising a cylinder, a piston slidably mounted therein providing a chamber in each end of said cylinder, a rod for said piston connectable to the element, a reversing valve slidably mounted in said piston, means for conducting pressure fluid to said valve for admission into either of said chambers, a stem for said valve, a second cylinder supported on said first mentioned cylinder, a piston slidably mounted therein, a rod for said piston in said second mentioned cylinder extending into the piston in said first mentioned cylinder and responsive to an automatic device, a third cylinder in said rod, a piston on said valve stem slidable in said third mentioned cylinder and responsive to an artificial stabilizer, means for manually actuating said rod and valve stem; and means for locking said rod and piston in said first mentioned cylinder for permitting the element to be adjusted by said manual means upon failure of pressure fluid to said first mentioned cylinder, said means permitting fluid to flow from one chamber to the other through the piston in said first mentioned cylinder when the pressure fluid supply to said first mentioned cylinder fails.

4. A power actuator for an element to be controlled, comprising an actuator cylinder, a piston for said cylinder providing a chamber in each end thereof, an actuator rod for said piston extending through each end of said cylinder, one end of said rod being connectable to the element, a reversing valve slidably mounted in said piston, a stem for said valve, means for conducting pressure fluid for selective admission to either of said chambers, an autopilot cylinder mounted on said actuator cylinder extending into said piston rod, a piston for said autopilot cylinder, a rod for the piston of said autopilot cylinder extending into the piston in said actuator cylinder, an artificial stabilizing cylinder in said rod, a piston on said valve stem for said stabilizing cylinder, means for manually actuating said rod, means in said actuator cylinder piston for locking said rod thereto upon failure of pressure fluid thereto for permitting said manual means to actuate the control surface; and means for centering said piston in said stabilizing cylinder upon failure of pressure fluid thereto.

5. An actuator for an element to be controlled, comprising a cylinder, a piston slidably mounted therein forming a chamber in each end of said cylinder, a pair of stops in said piston, a rod for said piston secured to the element, a reversing valve in said rod located exteriorly of said cylinder, means for delivering pressure fluid to said valve to be selectively applied to either end of said chamber, a second cylinder coaxially disposed with respect to said first mentioned cylinder, a piston in said second mentioned cylinder having a rod thereon movably connected with the piston in said first mentioned cylinder, the movement of the piston in said second mentioned cylinder being responsive to an automatic control device; and means responsive to pressure fluid delivered to said first mentioned cylinder for causing said stops to lock said pistons together.

6. A controllable power actuator for an element to be controlled, comprising a cylinder, a piston slidably mounted in said cylinder forming a chamber in each end thereof, a rod for said piston connectable to the element, a reversing valve for causing pressure fluid to be delivered to either of said chambers, a pair of stops in said piston, a stem for said valve, a second cylinder secured to and coaxially disposed with respect to said cylinder, a piston and a rod therefor slidably mounted in said second mentioned cylinder, one end of said rod extending into said first mentioned piston, said second mentioned piston moving in response to an automatic control device, means for manually moving said last mentioned rod, a cylinder chamber formed in the other end of said rod, a piston secured to said valve stem slidably mounted therein, the piston being responsive to a different control device for modifying the action of the piston in said second mentioned cylinder; and means responsive to failure of pressure fluid delivered to said reversing valve for causing said stops to lock said piston and said last mentioned rod together.

7. In a device as defined in claim 6 which includes means for centering the piston on said valve stem upon failure of pressure fluid delivered to the cylinder in the rod for said second mentioned cylinder.

8. An actuator for an element to be controlled, comprising a primary cylinder, a primary piston in said cylinder having a rod thereon connectable to the element, a reversing valve in said piston for selectively applying pressure fluid to either end of said piston, a pair of stops in said piston, a stem for said valve, a second cylinder secured to said primary cylinder, a piston and rod therefor, one end of said rod provided with a cylinder chamber therein, means on the other end of said rod engageable with said stops, said piston and rod being responsive to an automatic control device, manual means for actuating the piston and rod for said second mentioned cylinder, a piston on said stem slidably mounted in the chamber in the rod for said second mentioned cylinder and responsive to a different control device for modifying the action of said manual means or the automatic control device, said valve stem piston being held in position by the control device therefor, thereby enabling said manual means and said piston in said second mentioned cylinder to move said reversing valve; and means responsive to failure of pressure fluid to said primary cylinder for causing said stops to engage the rod for the piston in said second mentioned cylinder.

9. In a device as defined in claim 8 which includes opposed spring means acting on said valve stem for centering the piston on said stem in the cylinder formed in the rod for the second mentioned cylinder upon failure of pressure fluid to the chamber in said rod.

References Cited in the file of this patent

UNITED STATES PATENTS

| Number | Name | Date |
|---|---|---|
| 588,946 | Bergman | Aug. 31, 1897 |
| 738,793 | Green | Sept. 15, 1903 |
| 813,209 | Holmes | Feb. 20, 1906 |
| 1,199,036 | Hodgkinson | Sept. 19, 1916 |
| 1,628,603 | Ferris | May 10, 1927 |
| 1,851,816 | Dieter | Mar. 29, 1932 |
| 1,972,853 | Johnson | Sept. 11, 1934 |
| 2,225,952 | Clay | Dec. 24, 1940 |
| 2,227,375 | Carlson | Dec. 31, 1940 |
| 2,393,585 | Boynton et al. | Jan. 29, 1946 |
| 2,432,502 | Bentley et al. | Dec. 16, 1947 |
| 2,445,343 | Tyra | July 20, 1948 |
| 2,472,236 | Thomas | June 7, 1949 |

FOREIGN PATENTS

| Number | Country | Date |
|---|---|---|
| 464,891 | Great Britain | Apr. 27, 1937 |